(12) United States Patent
Nishimoto et al.

(10) Patent No.: US 9,899,911 B2
(45) Date of Patent: Feb. 20, 2018

(54) POWER SOURCE CIRCUIT

(71) Applicant: Panasonic Intellectual Property Management Co., Ltd., Osaka (JP)

(72) Inventors: Taiki Nishimoto, Osaka (JP); Akira Minegishi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 7 days.

(21) Appl. No.: 15/018,719

(22) Filed: Feb. 8, 2016

(65) Prior Publication Data
US 2016/0315552 A1   Oct. 27, 2016

(30) Foreign Application Priority Data

Apr. 27, 2015 (JP) .................................. 2015-090150

(51) Int. Cl.
*H02M 7/06* (2006.01)
*H02M 1/42* (2007.01)
*H02M 1/12* (2006.01)

(52) U.S. Cl.
CPC ......... *H02M 1/4225* (2013.01); *H02M 1/126* (2013.01); *Y02B 70/126* (2013.01)

(58) Field of Classification Search
CPC ............ H01L 25/07; H01L 24/01; H01L 2924/13091; H01L 2924/0002; H02M 1/088; H02M 7/003; H02M 1/34; H02M 2001/348

USPC ....................................................... 363/56.12
See application file for complete search history.

(56) References Cited

U.S. PATENT DOCUMENTS

| | | | |
|---|---|---|---|
| 2002/0113557 A1* | 8/2002 | Langeslag .......... | H05B 41/2856 315/219 |
| 2007/0188259 A1* | 8/2007 | Jones ..................... | H03F 1/565 333/32 |
| 2010/0309699 A1* | 12/2010 | Nishikawa .......... | H02M 1/4225 363/126 |

FOREIGN PATENT DOCUMENTS

| JP | 2005-086958 | | 3/2005 |
|---|---|---|---|
| JP | 2005086958 A | * | 3/2005 |
| JP | 2013-027241 | | 2/2013 |

\* cited by examiner

*Primary Examiner* — Adolf Berhane
*Assistant Examiner* — Afework Demisse
(74) *Attorney, Agent, or Firm* — McDermott Will & Emery LLP

(57) ABSTRACT

A power source circuit includes first and second input terminals; first, second, and third inductors; first and second switching devices; first and second capacitors; and first and second output terminals. A first end of the second inductor is connected to a path that connects the first input terminal and the first node, a second end of the second capacitor is connected to a path that connects the second input terminal and the second node, and the first inductor and the second inductor are magnetically coupled with each other. A first end of the third inductor and a second end of the second inductor are connected to each other. A second end of the third inductor and a first end of the second capacitor are connected to each other.

13 Claims, 7 Drawing Sheets

POWER SOURCE CIRCUIT

BACKGROUND

1. Technical Field

The present disclosure relates to a power source circuit (e.g., power supply circuit) that generates a predetermined voltage and current.

2. Description of the Related Art

Japanese Unexamined Patent Application Publication No. 2013-27241 discloses a buck converter circuit having a configuration for reducing current ripple due to a switching. Japanese Unexamined Patent Application Publication No. 2005-86958 discloses a switching power source having an input filter circuit.

In the related art, it is desired that normal-mode noise be reduced.

SUMMARY

In one general aspect, the techniques disclosed here feature a power source circuit that includes a first input terminal, a second input terminal, a first inductor; a second inductor, a third inductor, a first switching device, a second switching device, a first capacitor, a second capacitor, a first output terminal, and a second output terminal. The first input terminal and a first end of the first inductor are connected to each other, a second end of the first inductor and a second end of the second switching device are connected to each other, a first end of the second switching device and the first output terminal are connected to each other, the second input terminal and the second output terminal are connected to each other, a first end of the first switching device and a first node on a path that connects the second end of the first inductor and the second end of the second switching device are connected to each other, a second end of the first switching device and a second node on a path that connects the second input terminal and the second output terminal are connected to each other, a first end of the first capacitor and a third node on a path that connects the first end of the second switching device and the first output terminal are connected to each other, a second end of the first capacitor and a fourth node on a path that connects the second node and the second output terminal are connected to each other, a first end of the second inductor is connected to a path that connects the first input terminal and the first node, a second end of the second capacitor is connected to a path that connects the second input terminal and the second node, and the first inductor and the second inductor are magnetically coupled with each other, a first end of the third inductor and a second end of the second inductor are connected to each other, and a second end of the third inductor and a first end of the second capacitor are connected to each other.

According to the present disclosure, it is possible to reduce normal-mode noise.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiments of the present disclosure will be described below with reference to the accompanying drawings.

First, findings made by the present inventor will be described below in conjunction with an example of a power-factor correction circuit as an example.

Figure 13:
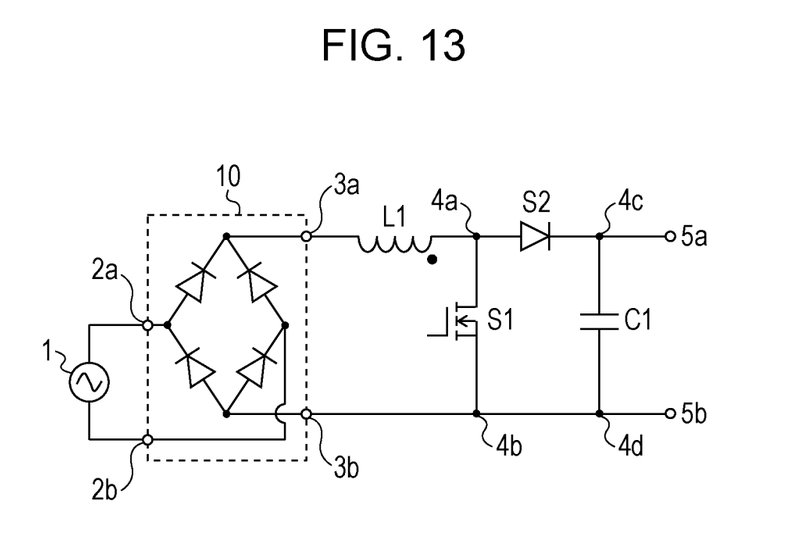
FIG. 13 is a circuit diagram illustrating a schematic configuration of a power-factor correction circuit in a comparative example.

FIG. 13 is a circuit diagram illustrating a schematic configuration of a power-factor correction circuit in a comparative example.

An alternating current (AC) voltage from an AC power source 1 is applied across a first input port 2a of a rectifier 10 and a second input port 2b of the rectifier 10.

The rectifier 10 rectifies the applied AC voltage, and the resulting voltage is applied across a first input terminal 3a and a second input terminal 3b as a direct current (DC) voltage.

A first switching device S1 is turned on or off. In this case, when the first switching device S1 is turned on, a second switching device S2 is turned off. Also, when the first switching device S1 is turned off, the second switching device S2 is turned on.

When the first switching device S1 is turned on, current energy is accumulated in a first inductor L1 (in this case, a choke coil).

When the second switching device S2 is turned on, energy is transmitted from the first inductor L1 to a first capacitor C1.

As a result, a DC voltage appears between a first output terminal 5a and a second output terminal 5b of the power-factor correction circuit.

In FIG. 13, a diode is depicted as the second switching device S2.

Even when the second switching device S2 is, for example, a transistor, the above-described operation can be achieved.

The first inductor L1 repeats accumulation and discharge of current energy. Thus, current that flows in the first inductor L1 has a waveform with a large triangular ripple. The current propagates to, for example, the AC power source 1 as noise.

The noise is classified into normal-mode noise and common-mode noise, according to the propagation characteristics thereof. The normal-mode noise is noise that circulates between power lines. The common-mode noise is noise that propagates on power lines in the same phase and propagates in an opposite phase by using a neutral line as a return path.

A triangular ripple involved in the operation of a power source circuit like the above-described power-factor correction circuit propagates as normal-mode noise.

A noise filter circuit is used in order to remove noise that flows out from the power source circuit through a power source line.

In order to reduce the normal-mode noise involved in the operation of the above-described power source circuit, it is necessary to increase the capacitance of a capacitor, called an X capacitor, in the noise filter circuit.

The X capacitor, however, is a large component in the noise filter circuit. Thus, in a power source circuit that needs to be miniaturized, it is necessary to reduce the capacitance of the X capacitor.

The power source circuit and the noise filter circuit may be fabricated on respective different substrates, for convenience of the circuit layout. Consequently, normal-mode noise involved in the operation of the power source circuit may propagate widely from the substrate of the power source circuit to the substrate of the noise filter circuit. As a result, the noise flows into a detection circuit and so on used for circuit control. This increases the risk of causing circuit malfunction. Also, on paths through which the noise propagates, the normal-mode noise is converted into common-mode noise. This complicates the propagation paths and makes it difficult to provide countermeasures against noise.

Based on the foregoing findings, the present inventor has conceived the configuration in the present disclosure.

(First Embodiment)

A power source circuit in a first embodiment includes a first input terminal, a second input terminal, a first inductor, a second inductor, a first switching device, a second switching device, a first capacitor, a second capacitor, a first output terminal, and a second output terminal.

The first input terminal and a first end of the first inductor are connected to each other.

A second end of the first inductor and a second end of the second switching device are connected to each other.

A first end of the second switching device and the first output terminal are connected to each other.

The second input terminal and the second output terminal are connected to each other.

A first end of the first switching device and a first node on a path that connects the second end of the first inductor and the second end of the second switching device are connected to each other.

A second end of the first switching device and a second node on a path that connects the second input terminal and the second output terminal are connected to each other.

A first end of the first capacitor and a third node on a path that connects the first end of the second switching device and the first output terminal are connected to each other.

A second end of the first capacitor and a fourth node on a path that connects the second node and the second output terminal are connected to each other.

A first end of the second inductor is connected to a path that connects the first input terminal and the first node.

A second end of the second inductor and a first end of the second capacitor are connected to each other.

A second end of the second capacitor is connected to a path that connects the second input terminal and the second node.

The first inductor and the second inductor are magnetically coupled with each other.

According to the above-described configuration, owing to effects of magnetic coupling between the first inductor and the second inductor, current that flows in the first inductor causes the voltage across terminals of the second capacitor to be excited at a switching frequency of the first switching device. As a result, some of ripple components in current that flows to at least one of the first inductor, the first switching device, and the second switching device can be supplied from a bypass B1 including the second inductor and the second capacitor. This can reduce normal-mode noise that flows out to the power source side of an input voltage.

A reduction in the normal-mode noise allows a capacitor having a small capacitance to be used as the X capacitor in the noise filter circuit. This makes it possible to miniaturize the noise filter circuit. The second inductor mainly carries ripple components in power-supply current. Thus, a narrow wire can be used as a winding of the second inductor. The second capacitor does not need to be a capacitor having a large capacitance. Thus, it is possible to reduce the sizes of components used as the second inductor and the second capacitor. Accordingly, even the noise filter circuit and the power source circuit are viewed as a whole, miniaturization is possible.

According to the configuration described above, noise can be reduced in the power source circuit. Thus, the propagation area of noise can be limited. This reduces the risk of causing circuit malfunction due to flow of noise into a detection circuit or the like used for circuit control. In other words, it is possible to reduce the difficulty of electromagnetic compatibility (EMC) design of circuits. In addition, mode conversion between the normal mode and the common mode occurs on a path through which noise propagates. When the range in which noise propagates is reduced, the amount of mode conversion also decreases. That is, the noise propagation paths are simplified. This makes it easy to provide countermeasures against noise.

For example, a power-factor correction circuit may be constituted using the power source circuit in the first embodiment.

Alternatively, for example, a boost converter circuit may be constituted using the power source circuit in the first embodiment.

The power source circuit in the first embodiment may include a magnetic core.

In such a case, a winding of the first inductor and a winding of the second inductor may be wound around the magnetic core.

According to the above-described configuration, the first inductor and the second inductor have windings around the same magnetic core. This provides a large mutual inductance. Thus, it is easier to obtain a greater noise reduction effect.

Also, in the first embodiment, each switching device may be implemented by a commonly known switching device, such as a transistor (e.g., a metal-oxide-semiconductor field-effect transistor (MOSFET) or an insulated-gate bipolar transistor (IGBT)).

Alternatively, in the first embodiment, the switching device may be implemented by a diode.

In the first embodiment, the first inductor may be a reactor.

A specific example configuration in the first embodiment will be described below in second to fourth embodiments.

(Second Embodiment)

The second embodiment will be described below. Descriptions that are substantially the same as those of the first embodiment are not given hereinafter, as appropriate.

First, a description will be given of an example in which a power-factor correction circuit is configured with a power source circuit in the second embodiment.

Figure 1:
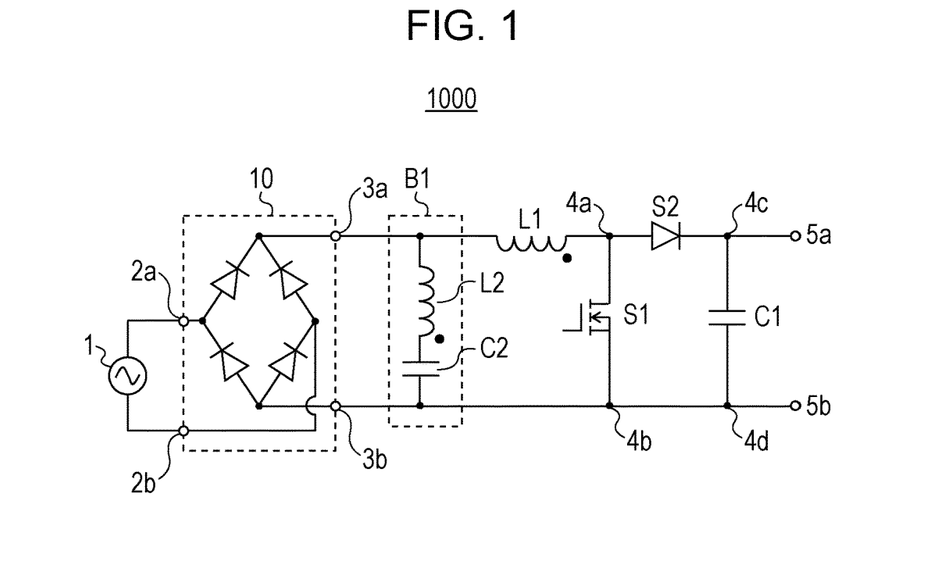
FIG. 1 is a circuit diagram illustrating a schematic configuration of a power-factor correction circuit in a second embodiment.

FIG. 1 is a circuit diagram illustrating a schematic configuration of a power-factor correction circuit 1000 in the second embodiment.

The power-factor correction circuit 1000 in the second embodiment includes a first input terminal 3a, a second input terminal 3b, a first inductor L1, a second inductor L2, a first switching device S1, a second switching device S2, a first capacitor C1, a second capacitor C2, a first output terminal 5a, and a second output terminal 5b.

The first input terminal 3a and a first end of the first inductor L1 are connected to each other.

A second end of the first inductor L1 and a second end of the second switching device S2 are connected to each other.

A first end of the second switching device S2 and the first output terminal 5a are connected to each other.

The second input terminal 3b and the second output terminal 5b are connected to each other.

A first end (e.g., a drain terminal) of the first switching device S1 and a first node 4a on a path that connects the second end of the first inductor L1 and the second end of the second switching device S2 are connected to each other.

A second end (e.g., a source terminal) of the first switching device S1 and a second node 4b on a path that connects the second input terminal 3b and the second output terminal 5b are connected to each other.

A first end of the first capacitor C1 and a third node 4c on a path that connects the first end of the second switching device S2 and the first output terminal 5a are connected to each other.

A second end of the first capacitor C1 and a fourth node 4d on a path that connects the second node 4b and the second output terminal 5b are connected to each other.

A first end of the second inductor L2 is connected to a path that connects the first input terminal 3a and the first node 4a.

A second end of the second inductor L2 and a first end of the second capacitor C2 are connected to each other.

A second end of the second capacitor C2 is connected to a path that connects the second input terminal 3b and the second node 4b.

The first inductor L1 and the second inductor L2 are magnetically coupled with each other.

In the example configuration illustrated in FIG. 1, the first inductor L1 and the second inductor L2 are coupled with each other in directions represented by dots (•) depicted in FIG. 1.

As described in the first embodiment, the first end of the second inductor L2 is connected to the path that connects the first input terminal 3a and the first node 4a.

More specifically, in the second embodiment, the first end of the second inductor L2 is connected to a path that connects the first input terminal 3a and the first end of the first inductor L1.

According to the above-described configuration, some of the ripple components in current that flows to the first inductor L1 can be supplied from a bypass B1 including the second inductor L2 and the second capacitor C2. This can reduce normal-mode noise of an input voltage, the noise flowing out to the power source side.

Noise can be most effectively reduced when current that flows to the second capacitor C2 at a switching frequency of the first switching device S1 matches current that flows to the first inductor L1. More specifically, noise can be most effectively reduced when $1/\{C_2 \times (L_2-M)\}$ matches the square of the switching angular frequency. In this case, M represents a mutual inductance of the first inductor L1 and the second inductor L2. $C_2$ represents the capacitance of the second capacitor C2. $L_2$ represents the inductance of the second inductor L2. However, even when the above-noted conditional expression is not satisfied, the noise reduction effect can be obtained.

Compared with a configuration in a third embodiment described below, the above-described configuration in the second embodiment has the following advantages.

Comparison of the second embodiment with the third embodiment indicates that, for obtaining the same noise reduction effect, the third embodiment has a larger rate of change in current that flows to the first switching device S1 and the second switching device S2 than the second embodiment. In the third embodiment, the rate of change in current that flows to the first switching device S1 and the second switching device S2 increases, as the second inductor L2 decreases. Thus, in the third embodiment, when the second inductor L2 becomes too small, the duty ratio of the first switching device S1 does not take a value as controlled, thus giving rise to the possibility of impairing the function serving as the power-factor correction circuit. Thus, in the second embodiment, an inductor that is smaller than that in the third embodiment can be used as the second inductor L2. Accordingly, in terms of miniaturization of the second inductor L2, the second embodiment is more advantageous than the third embodiment.

Also, for obtaining the same noise reduction effect, the current that flows in the bypass B1 in the third embodiment becomes larger than that in the second embodiment, as the second inductor L2 becomes small. Thus, in the second embodiment, a narrow wire can be used as the winding of the second inductor L2. Accordingly, in terms of miniaturization of the second inductor L2, the second embodiment is more advantageous than the third embodiment.

An allowable current of a capacitor decreases, as the frequency increases. Thus, when the amount of current that flows to the bypass B1 is large, there is a possibility that a plurality of capacitors need to be used in parallel as the second capacitor C2 in order to ensure the allowable current. In this point, the second embodiment is also more advantageous than the third embodiment.

In addition, the amount of switching frequency components of a voltage across the terminals of the second capacitor C2 in the second embodiment is smaller than that in the third embodiment. In view of the fact that the allowable voltage of the capacitor decreases as the frequency increases, the second embodiment is also advantageous than the third embodiment.

Figure 12:
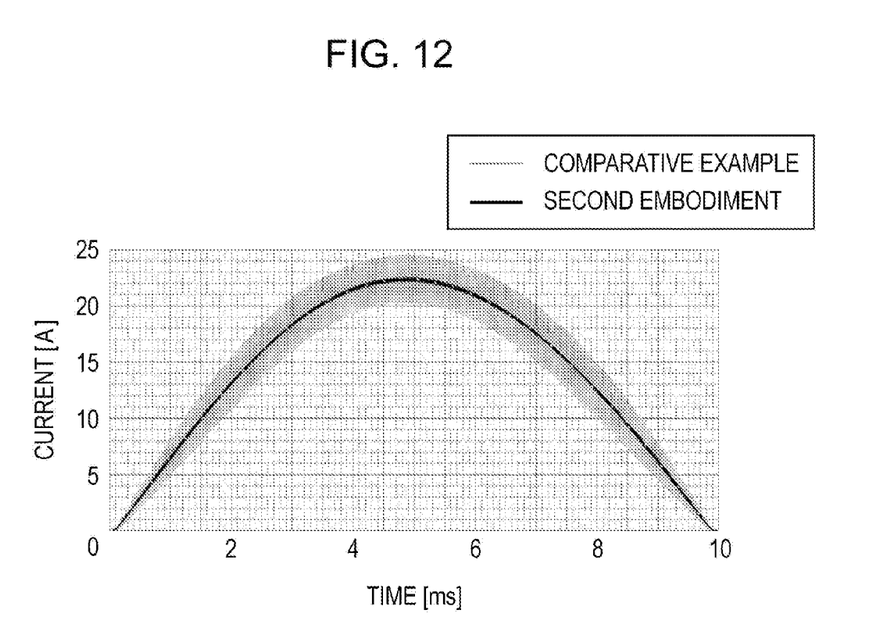
FIG. 12 is a graph illustrating computational results of circuit simulation of power source current in each of the second embodiment and a comparative example.

FIG. 12 is a graph illustrating computational results of circuit simulation of power source current in each of the second embodiment and a comparative example.

The power-factor correction circuit described above and illustrated in FIG. 13 was used in the comparative example.

An inductor of 200 uH was used as the first inductor L1 in each of the second embodiment and the comparative example.

The switching frequency of the first switching device S1 in each of the second embodiment and the comparative example was set to 100 kHz.

Also, an AC voltage having a frequency of 50 Hz and a root mean square (RMS) voltage value of 200 V was input as an input voltage in each of the second embodiment and the comparative example.

An inductor of 50 uH was used as the second inductor L2 in the second embodiment.

The mutual inductance of the first inductor L1 and the second inductor L2 in the second embodiment was set to 37.3 uH.

An output voltage in each of the second embodiment and the comparative example was a DC voltage of about 400 V.

As illustrated in FIG. 12, in the comparative example, the waveform appears to be a thick sine wave, because of a triangular ripple that occurs during a switching operation of the first switching device S1.

On the other hand, in the second embodiment, switching frequency components are supplied from the bypass B1. Accordingly, in the second embodiment, power source current having significantly small ripple is realized, as illustrated in FIG. 12.

In the comparative example, the power factor was 99.68%.

In the second embodiment, the power factor was 99.96%.

Thus, in the second embodiment, the power factor can be increased through suppression of ripple.

In the configuration illustrated in FIG. 1, a diode is used as the second switching device S2.

That is, in the second embodiment, the second switching device S2 may be a diode. In this case, the first end of the second switching device S2 is a cathode of the diode. The second end of the second switching device S2 is an anode of the diode.

Alternatively, the second switching device S2 may be a transistor. In this case, the first end of the second switching device S2 is, for example, a drain terminal. The second end of the second switching device S2 is, for example, a source terminal.

In the configuration illustrated in FIG. 1, the rectifier 10 is used.

That is, the power-factor correction circuit 1000 in the second embodiment may include the rectifier 10. In this case, a first output port of the rectifier 10 and the first input terminal 3a may be connected to each other. A second output port of the rectifier 10 and the second input terminal 3b may be connected to each other.

The rectifier 10 rectifies an AC voltage. For example, the rectifier 10 rectifies the AC voltage, which is an input voltage applied across the input terminals of the rectifier 10 (i.e., across the first input port 2a and the second input port 2b). The AC voltage, which is the input voltage, is output from, for example, the AC power source 1.

In the second embodiment, the rectifier 10 may be configured with a diode bridge using four diodes.

Alternatively, in the second embodiment, a configuration, such as a bridgeless topology or a totem-pole topology, may be used.

Figure 2:
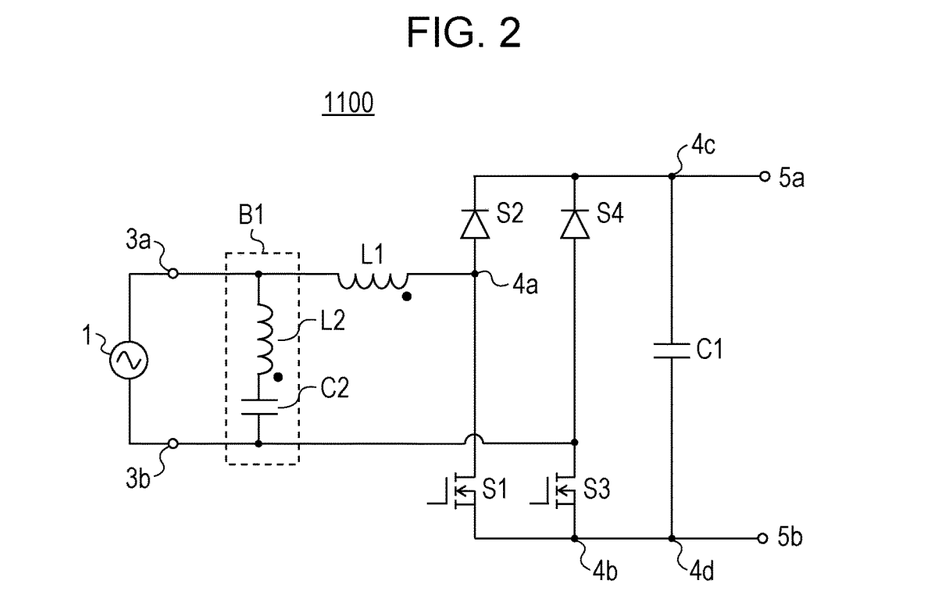
FIG. 2 is a circuit diagram illustrating a schematic configuration of a power-factor correction circuit in a modification of the second embodiment.

FIG. 2 is a circuit diagram illustrating a schematic configuration of a power-factor correction circuit 1100 in a modification of the second embodiment.

Figure 3:
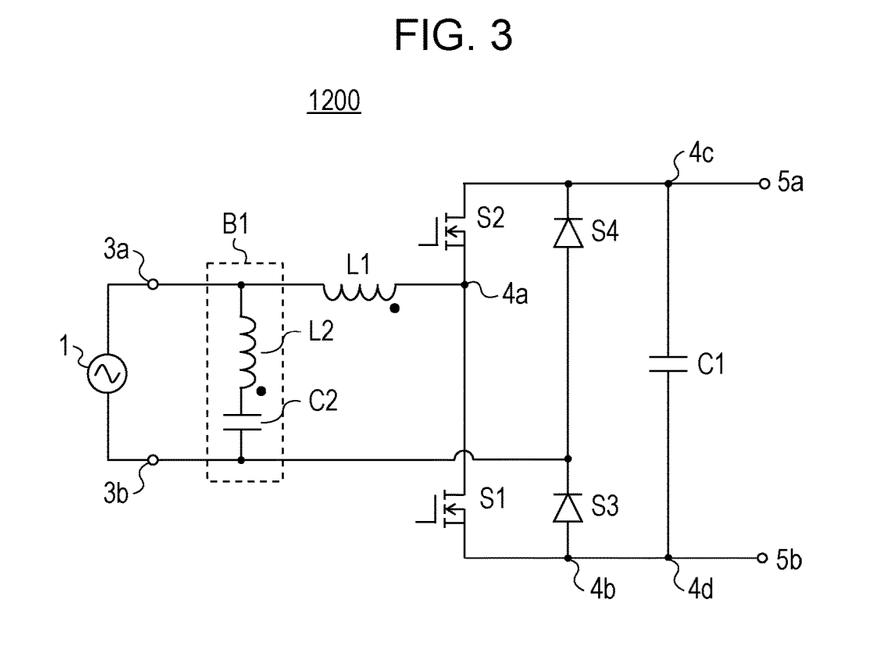
FIG. 3 is a circuit diagram illustrating a schematic configuration of a power-factor correction circuit in a modification of the second embodiment.

FIG. 3 is a circuit diagram illustrating a schematic configuration of a power-factor correction circuit 1200 in a modification of the second embodiment.

Each of the power-factor correction circuits 1100 and 1200 in the modifications illustrated in FIGS. 2 and 3 has substantially the same configuration as that of the above-described power-factor correction circuit 1000 and further includes a third switching device S3 and a fourth switching device S4.

The third switching device S3 is provided on a path that connects the second input terminal 3b and the second node 4b.

A second end of the third switching device S3 and the second node 4b are connected to each other.

A first end of the third switching device S3 and a second end of the fourth switching device S4 are connected to each other.

A first end of the fourth switching device S4 is connected to a path that connects the first end of the second switching device S2 and the third node 4c.

In the power-factor correction circuit 1100 illustrated in FIG. 2, the second switching device S2 is a first diode. In this case, the first end of the second switching device S2 is a cathode of the first diode. The second end of the second switching device S2 is an anode of the first diode.

In the power-factor correction circuit 1100 illustrated in FIG. 2, the fourth switching device S4 is a second diode. The first end of the fourth switching device S4 is a cathode of the second diode. The second end of the fourth switching device S4 is an anode of the second diode.

In the power-factor correction circuit 1100 illustrated in FIG. 2, the third switching device S3 is a transistor. In this case, the first end of the third switching device S3 is, for example, a drain terminal. The second end of the third switching device S3 is, for example, a source terminal.

In the power-factor correction circuit 1200 illustrated in FIG. 3, the third switching device is a first diode. In this case, the first end of the third switching device S3 is the cathode of the first diode. The second end of the third switching device S3 is an anode of the first diode.

In the power-factor correction circuit 1200 illustrated in FIG. 3, the fourth switching device S4 is a second diode. The first end of the fourth switching device S4 is a cathode of the second diode. The second end of the fourth switching device S4 is an anode of the second diode.

In the power-factor correction circuit 1200 illustrated in FIG. 3, the second switching device S2 is a transistor. The first end of the second switching device S2 is, for example, a drain terminal. The second end of the second switching device S2 is, for example, a source terminal.

In the power-factor correction circuit 1100 in the modification illustrated in FIG. 2, the operation described below is performed to control the power factor.

That is, in a period in which the output voltage of the AC power source 1 is positive, the third switching device S3 is on, and the fourth switching device S4 is off. In this case, the first switching device S1 and the second switching device S2 are alternately turned on and off.

In a period in which the output voltage of the AC power source 1 is negative, the first switching device S1 is on, and the second switching device S2 is off. In this case, the third switching device S3 and the fourth switching device S4 are alternately turned on and off.

In the power-factor correction circuit 1200 in the modification illustrated in FIG. 3, the operation described below is performed to control the power factor.

That is, in a period in which the output voltage of the AC power source 1 is positive, the third switching device S3 is on, and the fourth switching device S4 is off. At this point in time, the first switching device S1 and the second switching device S2 are alternately turned on and off.

In a period in which the output voltage of the AC power source 1 is negative, the third switching device S3 is off, and the fourth switching device S4 is on. At this point in time, the first switching device S1 and the second switching device S2 are alternately turned on and off.

The power-factor correction circuit in the embodiment may employ a commonly known control method. Thus, a detailed description is not given herein.

Figure 4:
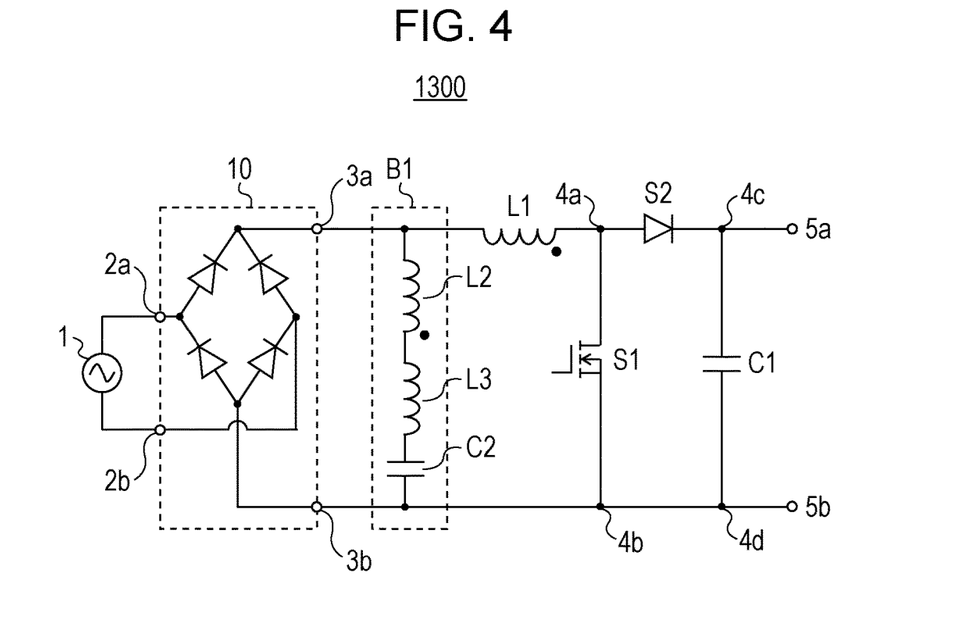
FIG. 4 is a circuit diagram illustrating a schematic configuration of a power-factor correction circuit in a modification of the second embodiment.

FIG. 4 is a circuit diagram illustrating a schematic configuration of a power-factor correction circuit 1300 in a modification of the second embodiment.

The power-factor correction circuit 1300 illustrated in FIG. 4 includes a third inductor L3 in addition to the above-described configuration of the power-factor correction circuit 1000.

In the power-factor correction circuit 1300 illustrated in FIG. 4, the third inductor L3 is connected between a path that connects the second end of the second inductor L2 and the first end of the second capacitor C2 and in series with the second inductor L2 and the second capacitor C2. In other words, a first end of the third inductor L3 and a second end of the second inductor L2 are connected to each other, and a second end of the third inductor L3 and a first end of the second capacitor C2 are connected to each other.

According to the configuration described above, even when the coupling coefficient of the first inductor L1 and the second inductor L2 is close to 1, the coupling coefficient between the first inductor L1 and bypass inductor L2+L3 appears to be equivalently small, because of the third inductor L3. Accordingly, with the third inductor L3, it is possible to equivalently achieve a desired coupling coefficient, without changing the shape of a magnetic core in the first inductor L1 in order to obtain a desired coupling coefficient. Specifically, for example, the third inductor can be configured, for example, by winding a coated wire around an enameled wire of a reactor having the enameled wire wound around a toroidal core. For example, this makes it possible to eliminate the need for design involving, for example, use of a magnetic core having a shape of branched magnetic paths in order to fabricate a reactor having a small coefficient of coupling between windings. That is, it is possible to simplify the design of magnetic parts. Typically, a magnetic core, such as an EI core or EE core, having branched magnetic paths is used as a loosely coupled magnetic part. With such a magnetic core, however, a portion around which a winding is wound is limited, and thus the size becomes larger than that in a case in which a simple toroidal core is used. Thus, with the configuration of the power-factor correction circuit 1300 illustrated in FIG. 4, the magnetic parts can be miniaturized in connection with the simplified design of the magnetic parts. The inductor being divided in the bypass portion has a significant meaning. Only a small current flows in the bypass portion, compared with a power line. Thus, the current rating of the third inductor L3 may be small, and a small-size part can be used as the third inductor L3. Similarly, a conducting wire having a small line diameter can be used as the winding of the second inductor L2. These points also contribute significantly to miniaturization. Also, being able to use an inductor having a small current rating means that the degree of freedom of part selection is high. In this point, the design can also be simplified. In addition, the equivalent coupling coefficient and the inductance (L2+L3) of the bypass portion can be adjusted using the third inductor L3. Thus, it is not necessary to repeat the design and trial production of a magnetic part in order to exhibit accurate characteristics by using the magnetic part alone. That is, it is possible to simplify the design and the fabrication of magnetic parts.

When the third inductor L3 is provided in addition to the above-described configuration of the power-factor correction circuit 1100 or the above-described configuration of the power-factor correction circuit 1200, as in the case described above, the same or similar advantages are obtained.

A boost converter circuit may be configured with the power source circuit in the second embodiment.

Figure 11:
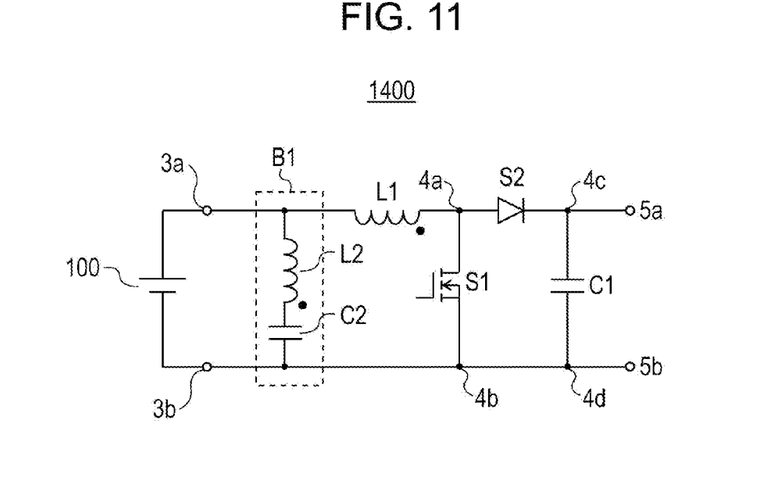
FIG. 11 is a circuit diagram illustrating a schematic configuration of a boost converter circuit in the second embodiment.

FIG. 11 is a circuit diagram illustrating a schematic configuration of a boost converter circuit 1400 in the second embodiment.

As illustrated in FIG. 11, a first input terminal 3a and a second input terminal 3b in the boost converter circuit 1400 in the second embodiment are connected to a DC power source 100.

The boost converter circuit 1400 in the second embodiment may operate, for example, as a step-up chopper circuit.

(Third Embodiment)

The third embodiment will be described below. Descriptions that are substantially the same as those of the first and second embodiments are not given hereinafter, as appropriate.

First, a description will be given of an example in which a power-factor correction circuit is configured with a power source circuit in the third embodiment.

Figure 5:
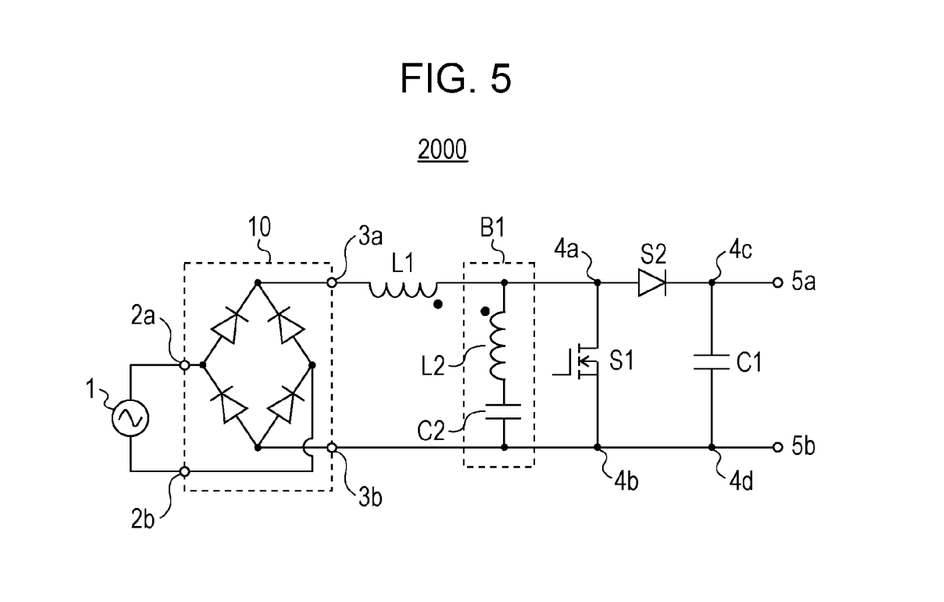
FIG. 5 is a circuit diagram illustrating a schematic configuration of a power-factor correction circuit in a third embodiment.

FIG. 5 is a circuit diagram illustrating a schematic configuration of a power-factor correction circuit 2000 in the third embodiment.

The first inductor L1 and the second inductor L2 are magnetically coupled with each other.

In the example configuration illustrated in FIG. 5, the first inductor L1 and the second inductor L2 are coupled with each other in directions indicated by dots (•) depicted in FIG. 5.

As described above in the first embodiment, the first end of the second inductor L2 is connected to the path that connects the first input terminal 3a and the first node 4a.

More specifically, in the third embodiment, the first end of the second inductor L2 is connected to a path that connects the second end of the first inductor L1 and the first node 4a.

According to the above-described configuration, some of ripple components of current that flows to the first switching device S1 and the second switching device S2 can be supplied from the bypass B1 including the second inductor L2 and the second capacitor C2. This can reduce normal-mode noise of an input voltage, the noise flowing out to the power source side.

A condition on which noise is most effectively reduced is substantially the same as the condition represented by the conditional expression described above in the second embodiment.

Additionally, compared with the configuration of the second embodiment, the configuration in the third embodiment has the following advantages.

In the second embodiment described above, the current that flows in the first inductor L1 includes a triangular ripple at a switching frequency. In contrast, in the third embodiment, the bypass B1 has already removed switching frequency components from the current that flows in the first inductor L1. Accordingly, in the third embodiment, iron loss due to hysteresis characteristics of the magnetic core in the first inductor L1 is reduced. In this point, the third embodiment is more advantageous than the second embodiment.

Figure 6:
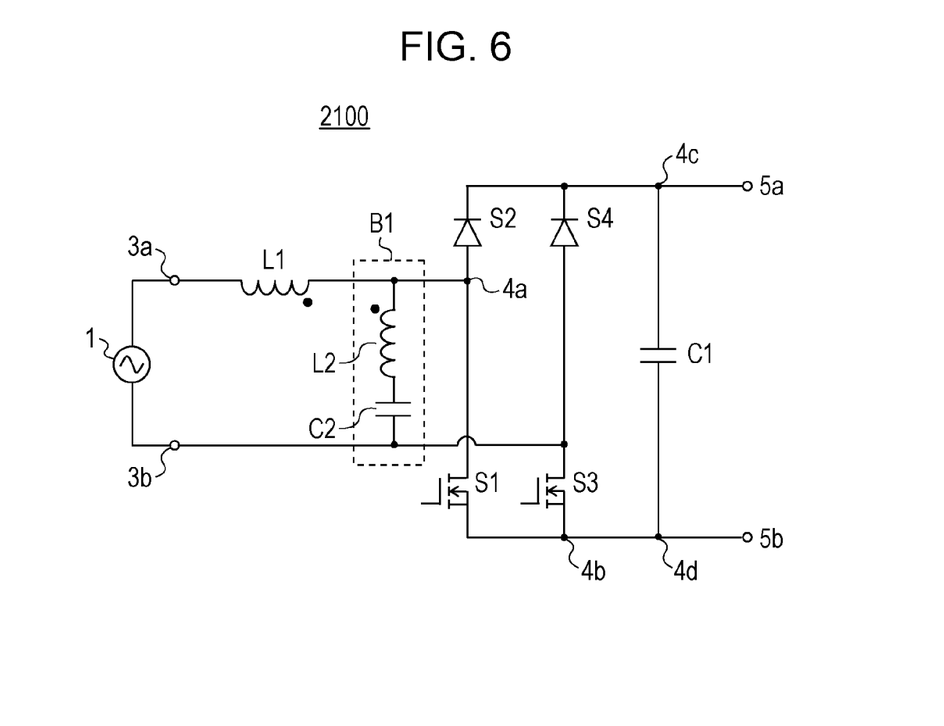
FIG. 6 is a circuit diagram illustrating a schematic configuration of a power-factor correction circuit in a modification of the third embodiment.
Figure 7:
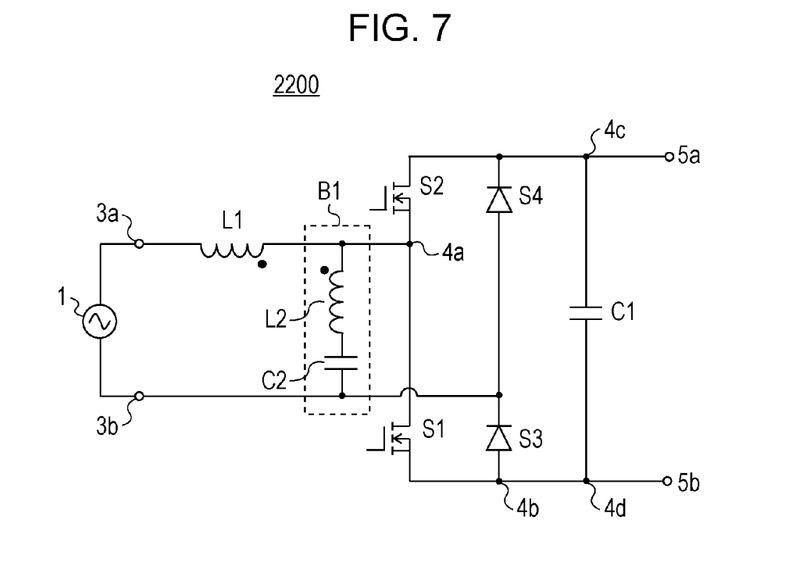
FIG. 7 is a circuit diagram illustrating a schematic configuration of a power-factor correction circuit in a modification of the third embodiment.

The power-factor correction circuit in the third embodiment may have a configuration without the rectifier 10, as in the above-described configuration of the power-factor correction circuit 1100 or the power-factor correction circuit 1200 (e.g., FIG. 6 or 7).

FIG. 6 is a circuit diagram illustrating a schematic configuration of a power-factor correction circuit 2100 in a modification of the third embodiment.

FIG. 7 is a circuit diagram illustrating a schematic configuration of a power-factor correction circuit 2200 in a modification of the third embodiment.

The power-factor correction circuit in the third embodiment may further include a third inductor L3, as in the above-described configuration of the power-factor correction circuit 1300.

That is, in the power-factor correction circuit in the third embodiment, the third inductor L3 may be connected between a path that connects the second end of the second inductor L2 and the first end of the second capacitor C2 and in series with the second inductor L2 and the second capacitor C2.

According to the above-described configuration, the design of magnetic parts can be simplified, as described in the second embodiment.

A boost converter circuit may be configured with the power source circuit in the third embodiment.

(Fourth Embodiment)

A fourth embodiment will be described below. Descriptions that are substantially the same as those of the first, second, and third embodiments are not given hereinafter, as appropriate.

First, a description will be given of an example in which a power-factor correction circuit is configured with a power source circuit in the fourth embodiment.

Figure 8:
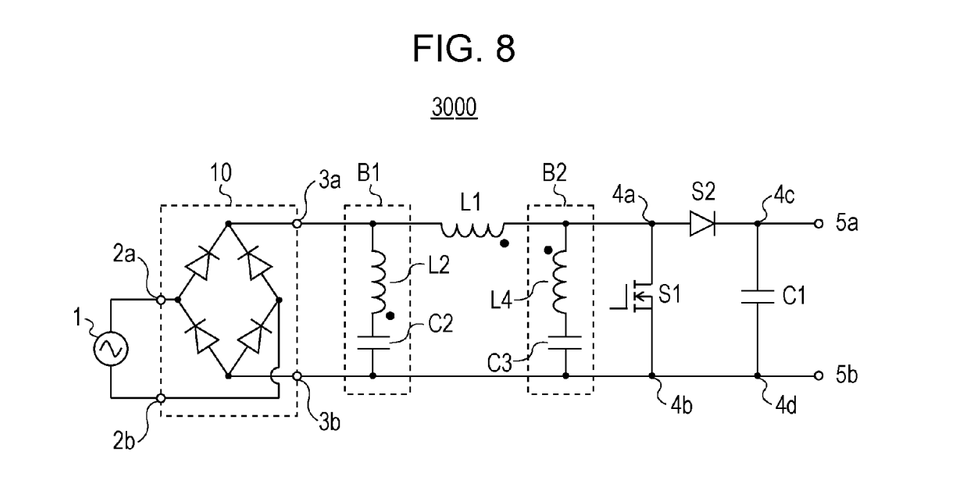
FIG. 8 is a circuit diagram illustrating a schematic configuration of a power-factor correction circuit in a fourth embodiment.

FIG. 8 is a circuit diagram illustrating a schematic configuration of a power-factor correction circuit 3000 in the fourth embodiment.

More specifically, the power-factor correction circuit 3000 in the fourth embodiment includes a fourth inductor L4 and a third capacitor C3, in addition to the configuration of the power-factor correction circuit 1000 in the second embodiment described above.

A first end of the fourth inductor L4 is connected to a path that connects the second end of the first inductor L1 and the first node 4a.

A second end of the fourth inductor L4 and a first end of the third capacitor C3 are connected to each other.

A second end of the third capacitor C3 is connected to a path that connects the second input terminal 3b and the second node 4b.

The first inductor L1, the second inductor L2, and the fourth inductor L4 are magnetically coupled with each other.

In the example configuration illustrated in FIG. 8, the first inductor L1, the second inductor L2, and the fourth inductor L4 are coupled to each other in directions indicated by dots (•) depicted in FIG. 8.

As described above, the power-factor correction circuit 3000 in the fourth embodiment has a combined configuration of the second and third embodiments.

That is, the power-factor correction circuit 3000 in the fourth embodiment includes the bypass B1 in the power-factor correction circuit 1000 in the second embodiment and also includes the bypass B1 in the power-factor correction circuit 2000 in the third embodiment as a bypass B2.

The configuration described above offers advantages described above in the second and third embodiments. That is, the advantages described in the second and third embodiments are further combined together. This makes it possible to more effectively reduce normal-mode noise.

Figure 9:
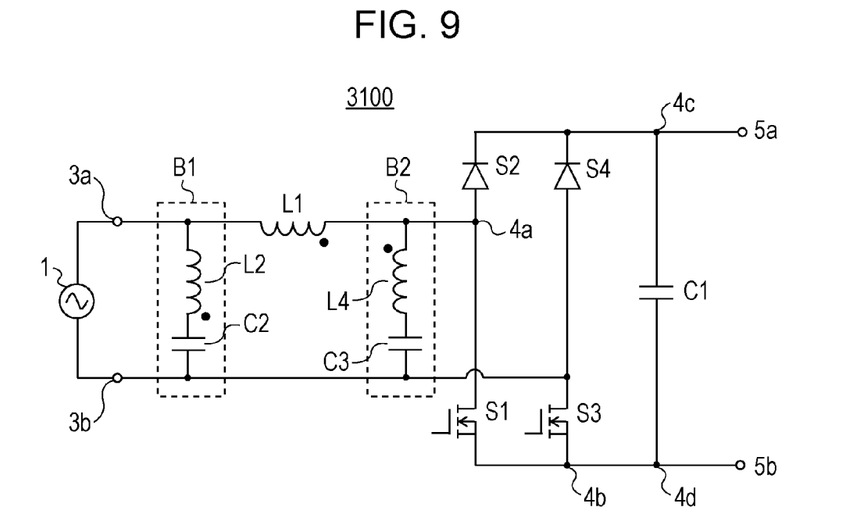
FIG. 9 is a circuit diagram illustrating a schematic configuration of a power-factor correction circuit in a modification of the fourth embodiment.
Figure 10:
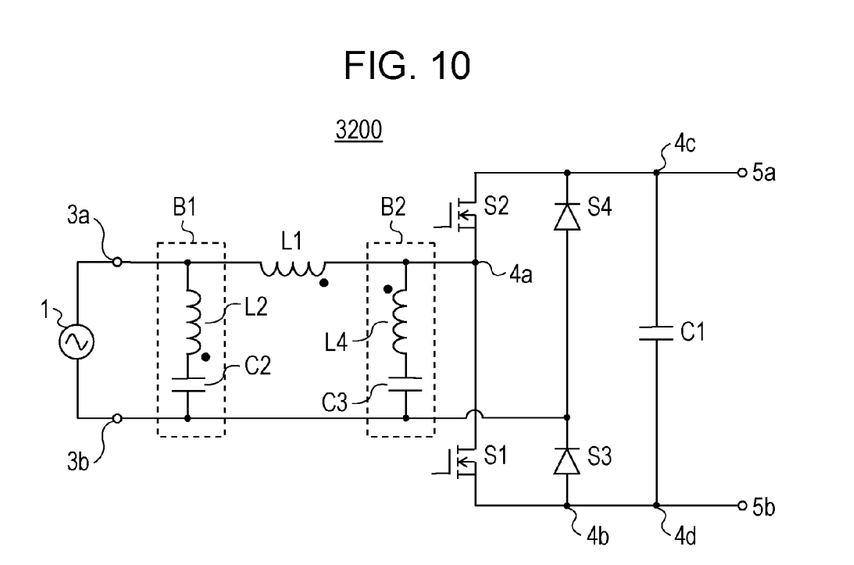
FIG. 10 is a circuit diagram illustrating a schematic configuration of a power-factor correction circuit in a modification of the fourth embodiment.

The power-factor correction circuit in the fourth embodiment may have a configuration without the rectifier 10, as in the above-described configuration of the power-factor correction circuit 1100 or the power-factor correction circuit 1200 (e.g., FIG. 9 or 10).

FIG. 9 is a circuit diagram illustrating a schematic configuration of a power-factor correction circuit 3100 in a modification of the fourth embodiment.

FIG. 10 is a circuit diagram illustrating a schematic configuration of a power-factor correction circuit 3200 in a modification of the fourth embodiment.

The power-factor correction circuit in the fourth embodiment may further include a third inductor L3, as in the above-described configuration of the power-factor correction circuit 1300.

That is, in the power-factor correction circuit in the fourth embodiment, the third inductor L3 may be connected between a path that connects the second end of the second inductor L2 and the first end of the second capacitor C2 and in series with the second inductor L2 and the second capacitor C2.

According to the above-described configuration, the design of magnetic parts can be simplified, as described in the second embodiment.

In this case, the power-factor correction circuit 3000 in the fourth embodiment may further include a fifth inductor L5.

That is, in the power-factor correction circuit 3000 in the fourth embodiment, the fifth inductor L5 may be connected between a path that connects the second end of the fourth inductor L4 and the first end of the third capacitor C3 and in series with the fourth inductor L4 and the third capacitor C3.

According to the configuration described above, even when the coupling coefficient of the first inductor L1 and the fourth inductor L4 is close to 1, the coupling coefficient appears to be equivalently small, because of the fifth inductor L5. Accordingly, with the fifth inductor L5, it is possible to equivalently design a desired coupling coefficient, without changing the shape of a magnetic core in the first inductor L1 in order to obtain a desired coupling coefficient. That is, it is possible to simplify the design of magnetic parts.

In addition, the power-factor correction circuit 3000 in the fourth embodiment may include a magnetic core.

In such a case, a winding of the first inductor L1, a winding of the second inductor L2, and a winding of the fourth inductor L4 may be wound around the magnetic core.

According to the above-described configuration, the first inductor L1, the second inductor L2, and the fourth inductor L4 have the windings around the same magnetic core. This provides a large mutual inductance. Thus, it is easier to obtain a greater noise reduction effect.

A boost converter circuit may be configured with the power source circuit in the fourth embodiment.

In the above-described embodiments of the present invention, the "connection between two elements" (e.g., one element connects to another element) may mean, not only a direct connection, but also an electrical connection and a connection in which an element (e.g., a wiring, a resistor, and the like, which do not impair the functions of the embodiments) is inserted therebetween.

The power source circuit in the present disclosure can be used as, for example, a power source circuit in a switching power source device or the like.

While the present disclosure has been described with respect to exemplary embodiments thereof, it will be apparent to those skilled in the art that the disclosure may be modified in numerous ways and may assume many embodiments other than those specifically described above. Accordingly, it is intended by the appended claims to cover all modifications of the disclosure that fall within the true spirit and scope of the disclosure.

What is claimed is:

1. A power source circuit comprising:
a first input terminal;
a second input terminal;
a first inductor;
a second inductor;
a third inductor;
a first switching device;
a second switching device;
a first capacitor;
a second capacitor;
a first output terminal; and
a second output terminal,
wherein the first input terminal and a first end of the first inductor are connected to each other,
a second end of the first inductor and a second end of the second switching device are connected to each other,
a first end of the second switching device and the first output terminal are connected to each other,
the second input terminal and the second output terminal are connected to each other,
a first end of the first switching device and a first node on a path that connects the second end of the first inductor and the second end of the second switching device are connected to each other,
a second end of the first switching device and a second node on a path that connects the second input terminal and the second output terminal are connected to each other,
a first end of the first capacitor and a third node on a path that connects the first end of the second switching device and the first output terminal are connected to each other,
a second end of the first capacitor and a fourth node on a path that connects the second node and the second output terminal are connected to each other,
a first end of the second inductor is connected to a path that connects the first input terminal and the first node,
a second end of the second capacitor is connected to a path that connects the second input terminal and the second node,
the first inductor and the second inductor are magnetically coupled with each other,
a first end of the third inductor and a second end of the second inductor are directly connected to each other, and
a second end of the third inductor and a first end of the second capacitor are directly connected to each other.

2. The power source circuit according to claim 1, further comprising:
a third switching device; and
a fourth switching device,
wherein the third switching device is provided on the path that connects the second input terminal and the second node,
a second end of the third switching device and the second node are connected to each other,
a first end of the third switching device and a second end of the fourth switching device are connected to each other, and
a first end of the fourth switching device is connected to a path that connects the first end of the second switching device and the third node.

3. The power source circuit according to claim 2,
wherein the second switching device is a first diode,
the first end of the second switching device is a cathode of the first diode,
the second end of the second switching device is an anode of the first diode,
the fourth switching device is a second diode,
the first end of the fourth switching device is a cathode of the second diode, and
the second end of the fourth switching device is an anode of the second diode.

4. The power source circuit according to claim 2,
wherein the third switching device is a first diode,
the first end of the third switching device is a cathode of the first diode,
the second end of the third switching device is an anode of the first diode,
the fourth switching device is a second diode,
the first end of the fourth switching device is a cathode of the second diode, and
the second end of the fourth switching device is an anode of the second diode.

5. The power source circuit according to claim 1, further comprising:
a rectifier that rectifies an alternating current voltage,
wherein a first output port of the rectifier and the first input terminal are connected to each other, and
a second output port of the rectifier and the second input terminal are connected to each other.

6. The power source circuit according to claim 5,
wherein the second switching device is a diode,
the first end of the second switching device is a cathode of the diode, and
the second end of the second switching device is an anode of the diode.

7. The power source circuit according to claim 1, wherein the first end of the second inductor is connected to a path that connects the first input terminal and the first end of the first inductor.

8. The power source circuit according to claim 1, wherein the first end of the second inductor is connected to a path that connects the second end of the first inductor and the first node.

9. The power source circuit according to claim 1, further comprising:
a magnetic core,
wherein a winding of the first inductor and a winding of the second inductor are wound around the magnetic core.

10. The power source circuit according to claim 7, further comprising:
a fourth inductor; and a third capacitor,
wherein a first end of the fourth inductor is connected to a path that connects the second end of the first inductor and the first node,
a second end of the fourth inductor and a first end of the third capacitor are connected to each other,
a second end of the third capacitor is connected to the path that connects the second input terminal and the second node, and
the first inductor and the fourth inductor are magnetically coupled with each other.

11. The power source circuit according to claim 10, further comprising:
a fifth inductor,
wherein the fifth inductor is connected between a path that connects the second end of the fourth inductor and the first end of the third capacitor and in series with the fourth inductor and the third capacitor.

12. The power source circuit according to claim 10, further comprising:
a magnetic core,
wherein a winding of the first inductor, a winding of the second inductor, and a winding of the fourth inductor are wound around the magnetic core.

13. The power source circuit according to claim 1, wherein the first input terminal and the first end of the first inductor are directly connected to each other.

* * * * *